United States Patent
Sobel et al.

[11] Patent Number: 5,818,343
[45] Date of Patent: Oct. 6, 1998

[54] REDUNDANTLY CODED VISUAL INDICATION SYSTEM

[75] Inventors: Jay Richard Sobel, Nepean; Thomas Winlow, Kanata; Miguel Planas, Ottawa, all of Canada

[73] Assignee: Northern Telecom Limited, Montreal, Canada

[21] Appl. No.: 759,091

[22] Filed: Nov. 29, 1996

[51] Int. Cl.⁶ .................................................... G08B 21/00
[52] U.S. Cl. ............................ 340/815.65; 340/815.43; 340/815.53
[58] Field of Search .............................. 340/815.65, 638, 340/639, 907, 815.43, 815.53, 825.19; 362/234, 236, 635

[56] References Cited

U.S. PATENT DOCUMENTS

| | | |
|---|---|---|
| 4,586,034 | 4/1986 | Nakamine .......................... 340/815.65 |
| 4,753,117 | 6/1988 | Osterhout et al. .................. 340/815.65 |
| 5,493,278 | 2/1996 | Mackenzie et al. ..................... 340/638 |

Primary Examiner—Jeffery Hofsass
Assistant Examiner—Davetta Woods
Attorney, Agent, or Firm—John A. Granchelli

[57] ABSTRACT

This invention relates to a visual indication system for a field replaceable unit. The system includes two or more visual indicators on a face of the field replaceable unit (FRU), each indicator having a unique shape and being switchable between an on state and an off state. Diagnostic and administrative control within the FRU functions to monitor overall operation of the FRU and, under the control of Network Operations Systems, selectively turns on or off the visual indicators to reflect status of the FRU.

25 Claims, 2 Drawing Sheets

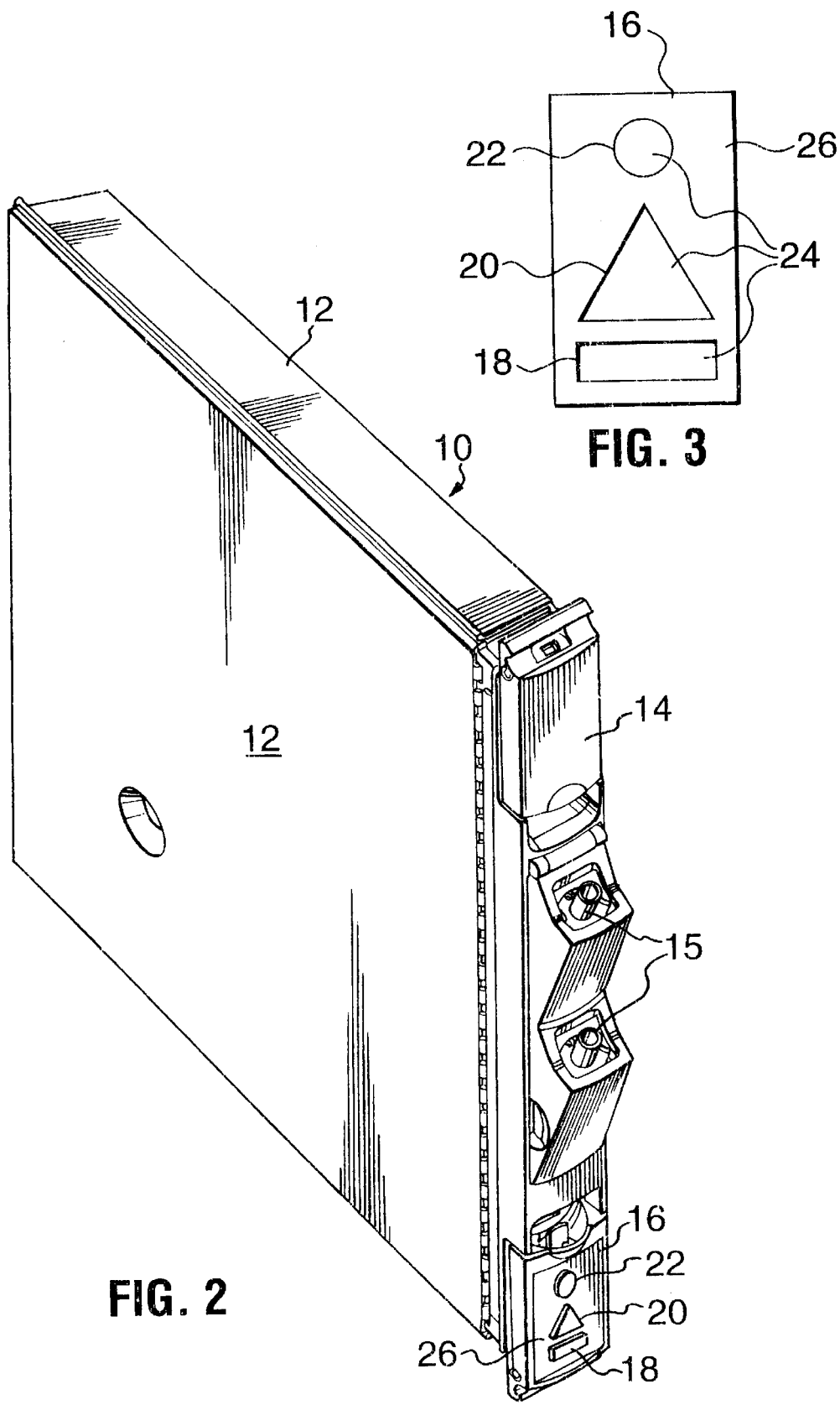

REDUNDANTLY CODED VISUAL INDICATION SYSTEM

RELATED APPLICATIONS

This application is related to copending U.S. patent applications Ser. No. 08/666,702, filed on Jun. 18, 1996, entitled "COMBINATIONS OF PRINTED CIRCUIT BOARDS AND FACE PLATES", the specification of which is incorporated herein by reference.

FIELD OF THE INVENTION

The present invention relates generally to visual indication systems and, in particular, to a combination of visual indicators which are redundantly coded in that each indicator has a unique shape and colour, as well as differing in size and location, whereby status information in respect of a field replaceable unit is represented through various illumination sequences.

BACKGROUND OF THE INVENTION

Within a telephone network, for example, switching and transmission products in operation at a central office are typically arranged in one or more equipment bays each having multiple shelves, and each shelf supporting multiple circuit packs in respective slots. When a particular circuit pack is faulty, a craftperson may remove the faulty pack and insert another pack that provides the same functionality as the faulty pack. Such a circuit pack, in general, is known as field replaceable unit (FRU).

With reference to FIG. 1, represented is a fault notification and response system which is well known in the telecommunications industry. A conventional FRU 10 is equipped with built-in-test hardware and supporting software to provide diagnostic and administrative control 12, and with one or more visual indicators 14 such as light emitting diodes (LEDs). A Network Operations Systems (OSs) 16 is communicatively coupled through a data link 18 to the FRU 10 and as well to a plurality of other FRUs (not shown), whereby the Network OSs 16 may provide centralized control of fault and alarm management for all these network elements with which it communicates.

The diagnostic and administrative control 12 functions to monitor overall operation of the FRU 10 and, under the control of the Network OSs 16, selectively turns on or off the visual indicators 14 to reflect the status of the unit. When a fault is detected in the FRU 10, the diagnostic and administrative control 12 notifies the Network OSs 16 over the data link 18. The OSs 16, in response, may send instructions to the diagnostic and administrative control 12 which accordingly turns on or off particular ones of the visual indicators 14 to indicate that the FRU 10 has failed. Subsequently, a craftperson person with a maintenance trouble ticket specifying the exact location of the FRU may be deployed to replace the faulty FRU 10 which should be identifiable both by the visual indicators 14 and by the ticket.

Although the above fault notification and response system seems simple to implement, it has been quite problematic in practice. Statistics suggest that a significant percentage of telephone network outages are due to human error, resulting from the removal of the wrong FRU by the craftperson. This has been attributed in part to: variability in indicator and alarm strategy meaning and implementation within and between switching and transmission product portfolios, whether from the same or different equipment vendors; and inconsistencies in product labelling.

Craft admit confusion and frustration with servicing existing CO equipment. In some products, a single red LED signifies that the product is up and running properly. In others, however, a green LED signifies an active product while a red LED signifies a product failure. Still in others, a single LED toggles between the colours green and red to signify active or fail, respectively. The craftperson with red and green colour blindness can not distinguish the state of an FRU when a single LED that toggles between these colours is used.

In some instances, the designation information presented to the craftperson on the maintenance trouble ticket fails to correspond with the designations on the actual product. These inconsistencies contribute to the difficulty craft experience in locating and identifying the FRU that requires their attention. Craft complain that they have to regularly re-familiarize themselves with the maintenance procedures for the particular product they are required to service. This reorientation process consumes time and energy, and contributes to frustration and confusion. Confusion and frustration lead to human error and network outages.

It is, therefore, desirable to improve the ability of the craftperson to locate and identify the field replaceable unit requiring attention.

SUMMARY OF THE INVENTION

It is an object of the present invention to provide a new and improved visual indication system.

The invention, therefore, according to a first broad aspect provides a method for indicating status of a field replaceable unit, comprising the steps of: providing, on a face of the field replaceable unit, a plurality of visual indicators being switchable between on and off states and having respective unique shapes; and controlling each visual indicator to select either the on state or the off state, whereby the plurality of visual indicators in respective selected states indicates the status of the field replaceable unit.

According to a second broad aspect, the present invention provides a visual indication system of a field replaceable unit, comprising: a plurality of visual indicators on a face of the field replaceable unit, the plurality of visual indicators being switchable between on and off states and having respective unique shapes; and means for controlling each visual indicator to select either the on state or the off state, whereby the plurality of visual indicators in respective selected states indicates the status of the field replaceable unit.

According to a third broad aspect, the present invention provides a method for guiding action of a craftperson in relation to a field replaceable unit (FRU) in use in an equipment bay, comprising the steps of: providing, on a face of the FRU, first and second visual indicators being switchable between on and off states and having respective unique shapes; selecting the on state of the first visual indicator and the off state of the second visual indicator, responsive to which no action is taken by the craftperson.

In a preferred embodiment, a field replaceable unit (FRU) bears redundantly coded visual indicators which are collocated on a face of the FRU. The redundantly coded visual indicators vary in shape and colour, as well as, size and location on the FRU face, whereby representations of status information may be presented by turning on and off the various indicators. For example, a green rectangle, when selectively illuminated, signifies that the FRU does not require attention and therefore, should not be touched by a craftperson. A red triangle, when selectively illuminated, signifies that the FRU requires attention. Under these circumstances, the most likely action by the craftperson is to replace the FRU with a new one. A yellow circle signifies that connectors and/or cabling directed towards and away from the FRU in question require attention. If the interconnect is fibre, for example, the most likely action by the craft is to clean the termination points.

The redundantly coded visual indicator system, in accordance with the present invention, enables the craftperson to better distinguish which indicators are on and off, thereby increasing the efficiency of the craftperson in performing maintenance tasks while reducing network outages attributed to human error. Through general acceptance as a standard what each redundantly coded visual indicator represents, further benefits include cost savings resulting from decreased manufacturing, inventory, documentation, and training costs. The illuminated indicator system enables craft to perform error free service on in use equipment, such as switching and transmission products, with comprehension, ease and expediency, by providing a series of visual cues that direct craft to the FRU that requires their attention.

BRIEF DESCRIPTION OF THE DRAWINGS

The invention will be better understood from the following description of a redundantly coded visual indication system, together with reference to the accompanying drawings in which:

FIG. 2 is a front isometric view of the field replaceable unit having the redundantly coded visual indication system; and FIG. 3 is a schematic illustration of three redundantly coded visual indicators.

DETAILED DESCRIPTION

Figure 1:
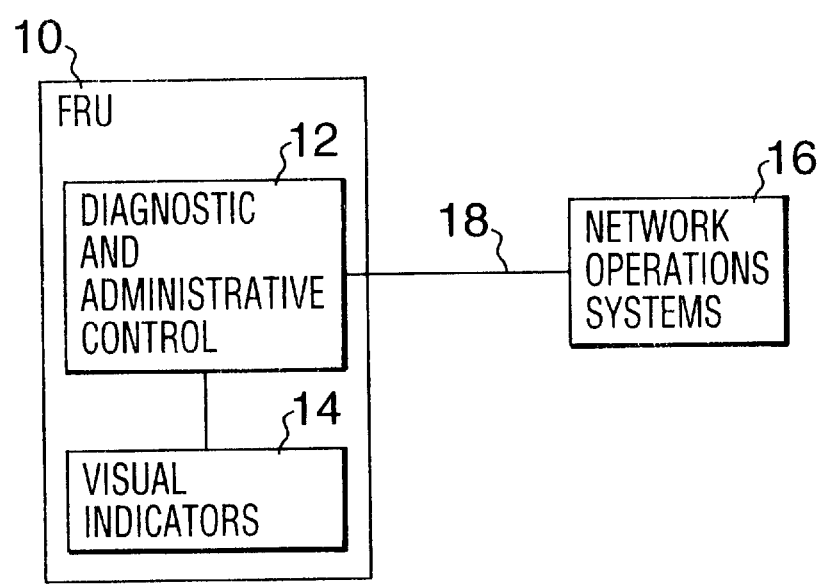
FIG. 1 is a schematic representation of a prior art fault notification and response system applied to a field replaceable unit.

Having regard to FIG. 2, an embodiment of a circuit pack 10, generally referred to as a field replaceable unit (FRU), comprises two side-by-side and spaced apart printed circuit boards 12, and a front plate 14 extending across and bridging the front edges of the two circuit boards 12. The front plate 14 extends from top to bottom of the circuit pack 10 and constitutes a face thereof visible to a craftperson when the circuit pack 10 is in use, for example, mounted in a shelf of a typical CO equipment bay. Provided on the front plate 14 are two connector adaptors 15 for carrying and connecting two optical fibre connectors.

Adjacent the bottom of the front plate 14 is a field 16 of three visual indicators 18, 20 and 22, an enlarged view of which is shown in FIG. 3. Each of the indicators 18, 20 and 22 consists of a uniquely shaped aperture 24, respectively being rectangular, triangular and round, through the front plate 14 behind which are uniquely coloured illumination devices, such as green, red and yellow light emitting diodes (LEDs) or lamps, respectively aligned with the apertures 24 of visual indicators 18, 20 and 22. On the face of the front plate 14, a transparent stencil 26 may be affixed over the field 14 to seal the apertures 14.

The combination of colour and shape, in respect of each indicator 18, 20 and 22, defines a redundantly coded visual indicator which is unique within the field 16. Furthermore, size and location of the individual indicators 18, 20 and 22 within the field 16 may be adjusted in order have certain indicators which are more prominent than others. The indicators 18, 20 and 22 are arranged in vertical order from the top, indicator 22, most to least critical, indicator 18. It is preferred to position the red/triangular indicator 20 in substantially vertical alignment above the green/rectangular indicator 18, and that the red/triangular indicator 20 be larger in size (e.g. surface area) that the green/rectangular indicator 18, whereby the red/triangular indicator 20 having a more critical representation would thus be more prominent when on, than indicator 18.

Although a single yellow/round visual indicator 22 forms part of the embodiment shown in FIGS. 2 and 3, as a variant, the system may comprise multiple yellow/round visual indicators 22 corresponding to respective connector adaptors 15.

As described above with respect to FIG. 1, the circuit pack 10 includes diagnostic and administrative control means which monitors operation of the pack 10, sends status information to a remote Network OSs. The diagnostic and administrative control means, in response to instructions received from the Network OSs, then selectively turns on or off the individual illumination devices of the visual indicators 18, 20 and 22 to represent the status of the circuit pack 10, thereby providing an action guide to a craftperson. Exemplary illumination sequences and representations thereby are as follows:

Both green/rectangular indicator 18 off and red/triangular indicator 20 off, may represent: indeterminate, no power, dead LEDs; test required; and craftperson should not pull module until further information is obtained.

Both green/rectangular indicator 18 on and red/triangular indicator 20 on, may represent a start-up lamp/LED test and FRU self test on initial insertion.

Green/rectangular indicator 18 on and red/triangular indicator 20 off may represent: everything is fine, traffic running; and do not pull card.

Green/rectangular indicator 18 off and red/triangular indicator 20 on, may represent: no traffic, failed or faulty; and this module may be pulled.

Green/rectangular indicator 18 off and red/triangular indicator 20 winking, such that it is cycled between being on and off at a predetermined rate, may represent to pull this FRU first.

Yellow/round indicator 22 off, may represent a live signal being received through connectors 15. Indicates to the craftperson that cabling connected to the FRU is fine.

Yellow/round indicator 22 on, may represent a loss of signal through connectors 15. Indicates to the craftperson that the cabling connected to the FRU requires attention.

With the redundantly coded visual indication system in use, for example, by a plurality of FRUs within an equipment bay, the craftperson is directed to the appropriate FRU that requires attention through the visual cues provided by the indicator fields on the plurality of FRUs within that shelf to which their field of view and attention is confined. The various indicators differ in size, shape, colour and location within the field, providing easily detectable relative differences between FRUs that permit craft to distinguish which indicator field is different from the others and, therefore, to identify and locate the specific FRU that requires attention. The red triangle that when illuminated signifies that this FRU requires address is located superior to the green rectangle that when illuminated signifies do not address this FRU. Upon identifying the correct FRU that requires attention, the craftperson may check their trouble ticket against a graphic designation on the shelf associated with the FRU requiring attention, and this added redundancy in information reaffirms that the level of address, the FRU, is correct.

Those skilled in the art will recognize that various modifications and changes could be made to the invention without departing from the spirit and scope thereof. It should therefore be understood that the claims are not to be considered as being limited to the precise embodiments of the redundantly coded visual indicator system set forth above, in the absence of specific limitations directed to each embodiment.

We claim:

1. A method for indicating status of a field replaceable unit, comprising the steps of:
   providing, on a face of the field replaceable unit, a plurality of visual indicators being switchable between on and off states and having respective unique shapes; and
   controlling each visual indicator to select either the on state or the off state, whereby the plurality of visual indicators in respective selected states indicates the status of the field replaceable unit.

2. A method as claimed in claim 1, wherein the plurality of visual indicators have respective unique colours.

3. A method as claimed in claim 2, wherein the plurality of visual indicators are arranged in substantial vertical alignment on the face.

4. A method as claimed in claim 3, wherein the plurality of visual indicators includes first and second visual indicators, with the shape of the first visual indicator being rectangular and the shape of the second visual indicator being triangular.

5. A method as claimed in claim 4, wherein the colour of the first visual indicator is green and the colour of the second visual indicator is red.

6. A method as claimed in claim 5, wherein the second visual indicator is positioned above the first visual indicator.

7. A method as claimed in claim 3, wherein the plurality of visual indicators includes at least one of a third visual indicator being positioned above the second visual indicator, with the shape of the third visual indicator being round and the colour of the third visual indicator being yellow.

8. A visual indication system of a field replaceable unit, comprising:
   a plurality of visual indicators on a face of the field replaceable unit, the plurality of visual indicators being switchable between on and off states and having respective unique shapes; and
   means for controlling each visual indicator to select either the on state or the off state, whereby the plurality of visual indicators in respective selected states indicates the status of the field replaceable unit.

9. A visual indication system as claimed in claim 8, wherein the plurality of visual indicators have respective unique colours.

10. A visual indication system as claimed in claim 9, wherein the plurality of visual indicators are arranged in substantial vertical alignment on the face.

11. A visual indication system as claimed in claim 10, wherein the plurality of visual indicators includes first and second visual indicators, with the shape of the first visual indicator being rectangular and the shape of the second visual indicator being triangular.

12. A visual indication system as claimed in claim 11, wherein the colour of the first visual indicator is green and the colour of the second visual indicator is red.

13. A visual indication system as claimed in claim 12, wherein the second visual indicator is positioned above the first visual indicator.

14. A visual indication system as claimed in claim 13, wherein the plurality of visual indicators includes at least one of a third visual indicator being positioned above the second visual indicator, with the shape of the third visual indicator being round and the colour of the third visual indicator being yellow.

15. A method for guiding action of a craftperson in relation to a field replaceable unit (FRU) in use in an equipment bay, comprising the steps of:
   providing, on a face of the FRU, first and second visual indicators being switchable between on and off states and having respective unique shapes;
   selecting the on state of the first visual indicator and the off state of the second visual indicator, responsive to which no action is taken by the craftperson.

16. A method as claimed in claim 15, further comprising selecting the off state of the first visual indicator and the on state of the second visual indicator, responsive to which the craftperson removes the FRU from the equipment bay.

17. A method as claimed in claim 16, further comprising selecting, in response to initial insertion of the FRU by the craftperson into the equipment bay, the on state of the first visual indicator and the on state of the second visual indicator.

18. A method as claimed in claim 17, further comprising selecting the off state of the first visual indicator and cycling between the on and off states of the second visual indicator, responsive to which the removes the FRU first from the equipment bay.

19. A method as claimed in claim 18, further comprising selecting the off state of the first visual indicator and the off state of the second visual indicator, responsive to which the craftperson does not remove the FRU until further information is obtained.

20. A method as claimed in claim 18, further comprising:
   providing, on the face of the FRU, a third visual indicator being switchable between on and off states and having a unique shape in relation to the first and second visual indicators; and
   selecting the off state of the third indicator when a live signal is being received by the field replaceable unit, responsive to which no action is taken by the craftperson.

21. A method as claimed in claim 20, further comprising selecting the on state of the third indicator when the FRU has lost the signal, responsive to which the craftperson checks one or more connectors of the FRU.

22. A method as claimed in claim 21, wherein the shape of the first visual indicator is rectangular, the shape of the second visual indicator is triangular, and the shape of the third visual indicator is round.

23. A method as claimed in claim 22, wherein the first, second and third visual indicators have respective unique colours.

24. A method as claimed in claim 23, wherein the colour of the first visual indicator is green, the colour of the second visual indicator is red, and the colour of the third visual indicator is yellow.

25. A method as claimed in claim 24, wherein the first, second and third visual indicators are arranged in substantial vertical alignment on the face, with the third visual indicator being positioned above the second visual indicator which is positioned above the first visual indicator.

* * * * *